UNITED STATES PATENT OFFICE.

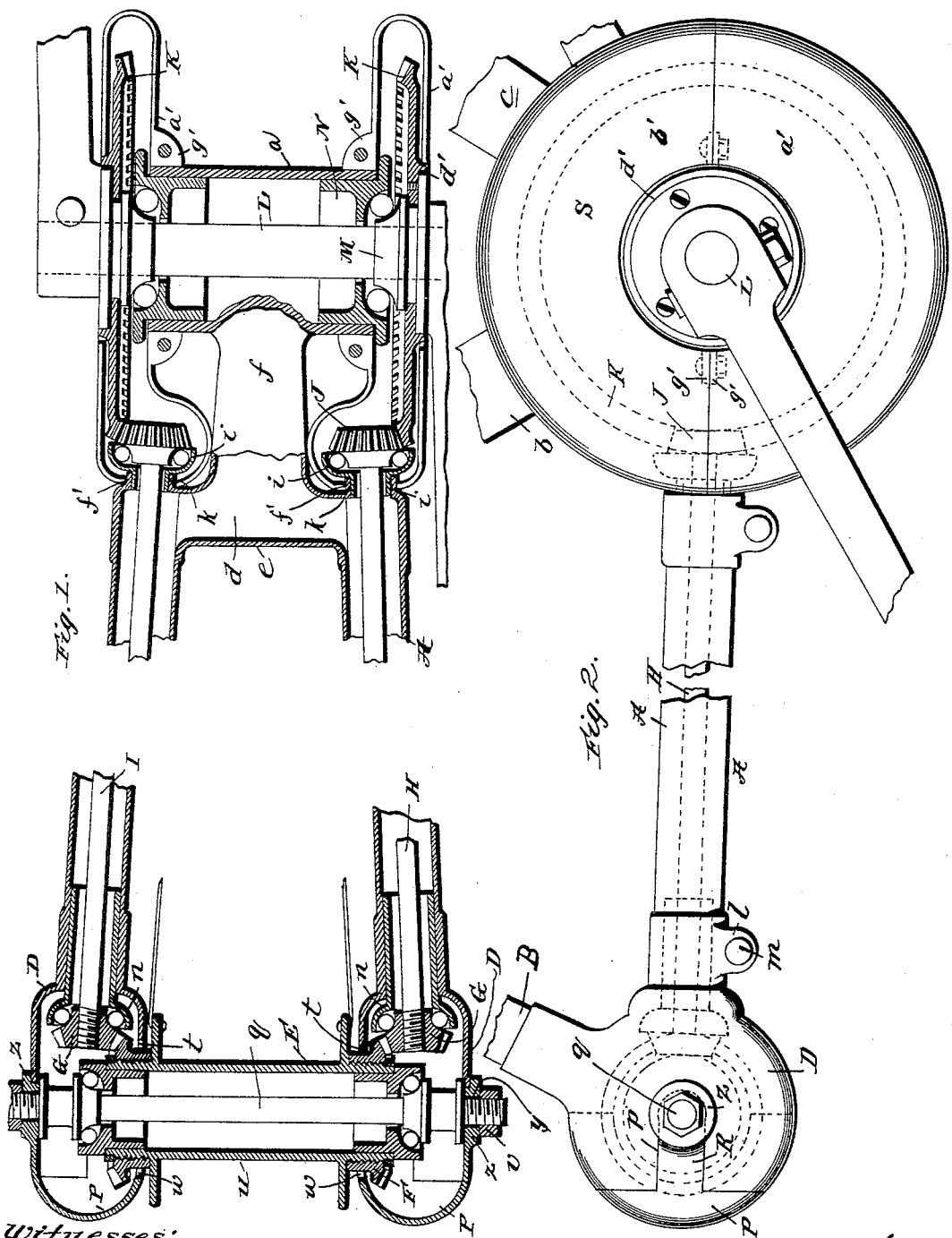

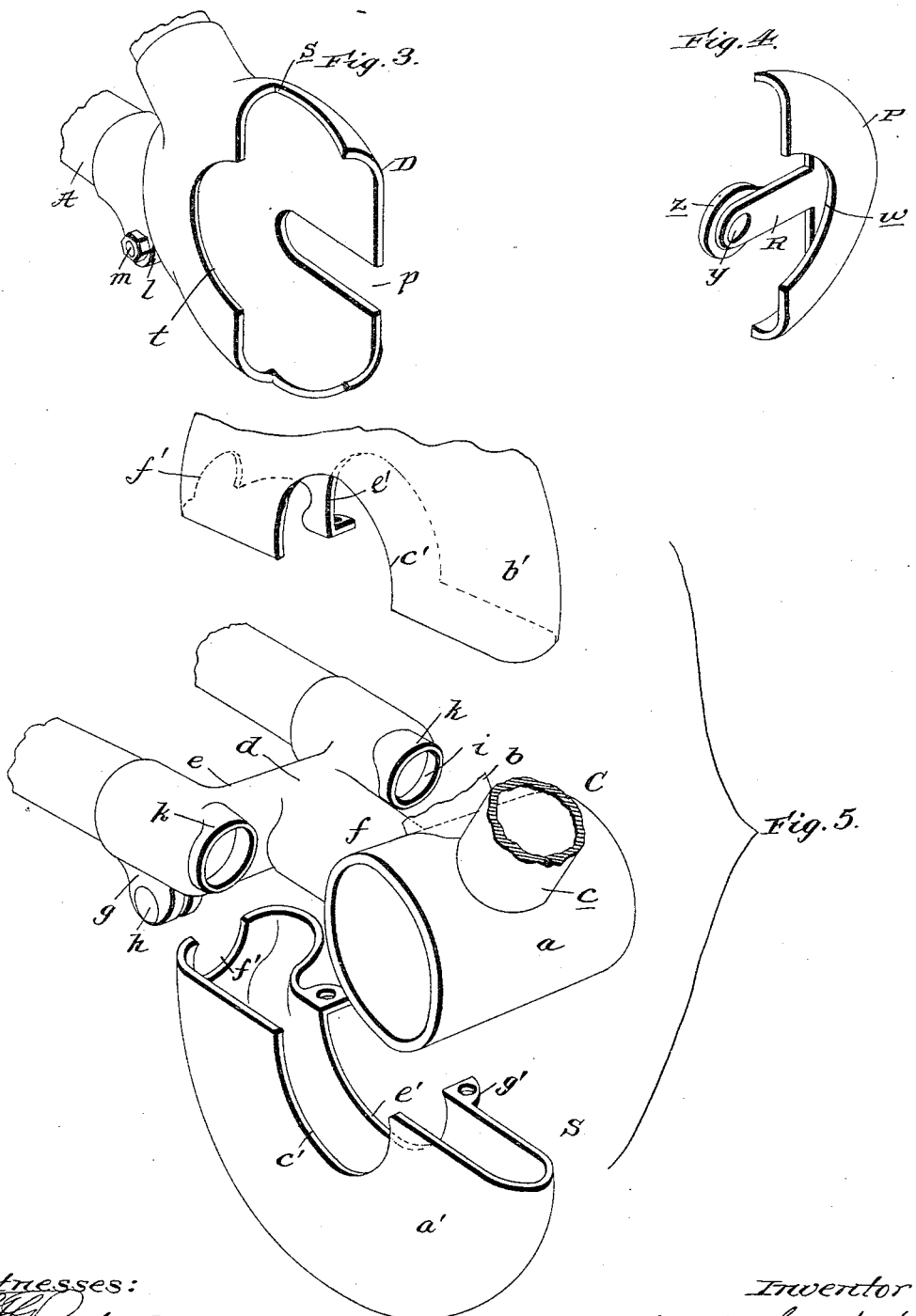

GEORGE HARDEN, OF TOLEDO, OHIO, ASSIGNOR OF ONE-HALF TO JAMES E. CRONAN, OF DAYTON, OHIO.

BICYCLE.

SPECIFICATION forming part of Letters Patent No. 616,571, dated December 27, 1898.

Application filed January 26, 1898. Serial No. 668,044. (No model.)

*To all whom it may concern:*

Be it known that I, GEORGE HARDEN, a citizen of the United States, residing at Toledo, in the county of Lucas and State of Ohio, have invented certain new and useful Improvements in Bicycles; and I do declare the following to be a full, clear, and exact description of the invention, such as will enable others skilled in the art to which it appertains to make and use the same.

My invention relates to that class of bicycles which have gears intermediate of the crank-shaft and rear wheel for propulsion purposes; and it contemplates the provision of equalizing intermediate propelling-gears between the crank-shaft and rear or drive wheel at both sides of the bicycle, so as to permit of the employment of small gears and at the same time prevent the imposition of torsional strain upon any part of the running-gear; the provision of a frame which is so constructed as to incase the longitudinal gear-shafts and rear gears and permit of ready access being had to the forward gears on the shafts for adjustment or other purposes; the provision of removable cases for the intermeshed gears and the longitudinal and crank shafts and the utilization of portions of the frame for holding said cases against rotation and also against lateral movement or displacement, and the provision of removable caps for the rear gear-cases, whereby access may be had to the rear gear-wheels for any desired purpose.

With the foregoing ends in view the invention will be fully understood from the following description and claims when taken in conjunction with the annexed drawings, in which—

Figure 1 is a broken horizontal section of a portion of a bicycle constructed in accordance with my invention. Fig. 2 is a broken side elevation of the same. Fig. 3 is a detail perspective view of one of the gear-cases of the frame. Fig. 4 is a perspective view of the closure-cap of the same; and Fig. 5 comprises a detail perspective view of a portion of the frame, illustrating the novel connection between the bottom runs and the crank-hanger, together with perspective views of the two sections of one of the removable gear-cases.

In the said drawings similar letters designate corresponding parts in all of the several views, referring to which—

A designates the tubular bottom runs of my improved bicycle-frame. B designates the rear stays, and C designates the novel and advantageous bottom bracket, which is preferably of crucible-steel and is made up of the crank-hanger $a$, designed to be connected with the seat-post tube $b$ and bottom line runner $c$ in the usual manner, and the T-coupling $d$, comprising the transverse portion $e$ and the longitudinal central portion $f$, the said transverse portion $e$ being designed to be cored out and milled to receive the bottom line runs and being provided with lugs $g$ and bolts $h$ for the purpose of securing ball-bearing cups $i$ in its apertures $j$, the said cups being provided with sleeves or collars at their inner sides, as best shown in Fig. 1. Said transverse portion $e$ is further provided with collars $k$, which surround its apertures $j$ and are designed to serve an important purpose, as will be presently pointed out.

D designates the rear gear-cases, which are also preferably formed of crucible-steel, the said cases in the preferred embodiment of the invention being connected to the rear stays B and bottom runs A by flush-joints and being provided with lugs $l$ and bolts $m$ for securing ball-bearing cups $n$, which also have sleeves or collars, in the rear ends of the bottom runs, as shown. The cases D are of the construction best shown in Fig. 3—that is to say, they are provided with notches $p$ in their outer side walls to receive the axle $q$ of the rear wheel E and are recessed in an angular manner, as indicated by $s$, and are provided with circular notches $t$ in their inner side walls to accommodate the hub $u$ of the rear wheel, as best shown in Fig. 1.

The axle of the rear wheel E is arranged in the notches $p$ of the cases D and secured by nuts $v$, and the hub of said wheel is provided with left-hand threads at one end and right-hand threads at its opposite end for the engagement of correspondingly-threaded outer gears F, as shown. With these gears F mesh miter-gears G, which are tapped to engage right and left hand threads on shafts H I, respectively, and are shaped to serve the additional function of cones, antifriction-balls being interposed between them and the cups $n$, as illustrated.

The longitudinal shafts H I extend through the bottom runs A, as shown, and have their forward ends provided with right and left hand threads, respectively, to engage corresponding taps in miter-gears J, which, like the gears G, are designed to serve as cones and bear on antifriction-balls in the cups $i$, as illustrated. These gears J mesh with large miter-gears K, which are fixed on a crank-shaft L at opposite ends thereof and have their hubs M shaped to form cones which are adapted to bear on antifriction-balls arranged in cups N, suitably secured in the crank-hanger.

In virtue of the gearing just described it will be observed that the power is equalized—i. e., applied equally to both sides of the rear or drive wheel E—which is an important advantage, as it effectually prevents the imposition of torsional strain upon any part of the gearing. Again, it will be observed that the employment of the duplicate gearing at opposite sides of the bicycle admits of the shafts H being made small, and thus renders it unnecessary to increase the diameter of the bottom runs A.

Being mounted in the manner described the gears F G are adapted to be readily adjusted when necessary. In order to cover and exclude dust from said gears and yet permit of ready access being had to the same when necessary, I provide, in conjunction with the gear-cases D, the removable caps P. These caps P are shaped to rest against the rear end and in the angular recesses $s$ of the cases D, whereby it will be seen that they will close said cases and be held thereby against lateral movement or displacement. The said caps P have their inner side walls notched, as indicated by $w$, to accommodate the hub of the wheel E and the gears F, and they also have the shanks R on their outer walls, as illustrated. These shanks R are designed to rest in and close the notches $p$ of the cases D, as shown in Figs. 1 and 2, and they are apertured, as indicated by $y$, to receive the axle $q$ and are provided with the exterior offset portions $z$, which afford bearing-surfaces for the nuts on the axle, and also by bearing against the outer sides of the cases D serve the important function of preventing laterally-inward movement or displacement of the caps. Thus it will be seen that the caps are secured against lateral movement or displacement in either direction. It will also be seen that when it is desired to remove the rear wheel it is simply necessary to loosen the nuts on the axle thereof and draw the wheel outward with the caps on the axle.

The gears J are adapted to be adjusted on the shafts H I when necessary, and it will be observed that the peculiar T connection between the bottom runs and the hanger will permit of ready access being had to the gear J when necessary and will also permit of the gears being conveniently adjusted and will further enable a mechanic to quickly and easily assemble the parts of the gearing.

S designates the removable gear-cases for inclosing the gears J K. These gear-cases S are arranged at the opposite ends of the crank-hanger and they respectively comprise the lower and upper sections $a'b'$, with notches $c'$ in the meeting edges of their outer walls to accommodate the annular lateral projections $d'$ of the gear-wheels K, notches $e'$ in the meeting edges of their inner walls to accommodate the crank-hanger, and notches $f'$ in the meeting edges of their end walls to receive the collars $j$ of the frame. The said upper and lower casing-sections are also provided with apertured lugs $g'$ on the meeting edges of their inner walls to receive connecting-bolts, as shown by dotted lines in Fig. 2. It will be appreciated from the construction just described that the cases S are held against lateral and vertical movement by their connection to the crank-hanger and that they are held against rotation and also against lateral movement by their connection to the collars J of the frame.

Having thus described my invention, what I claim is—

1. In a bicycle, the combination of a frame comprising tubular bottom runs, a crank-hanger, and a T connection between the forward ends of the runs and the hanger, and having apertures in the forward side of the transverse portion of the T connection coincident with the bottom runs and also having lugs at the ends of the runs and clamping-bolts extending through the same, cups having sleeves arranged in the ends of the runs, a wheel supported in the frame and arranged between the bottom runs and having gears at the opposite ends of its hub, a crank-shaft journaled in the hanger and having gears on opposite sides of the same, shafts extending through the bottom runs and equipped at their opposite ends with gears meshing with the gears on the crank-shaft and wheel-hub and having their inner sides shaped to form cones, and antifriction-balls interposed between the cups and cones, substantially as specified.

2. In a bicycle, the combination of a frame comprising bottom runs, a crank-hanger, and a T connection between the forward ends of the runs and the hanger and having an aperture in the forward side of the transverse portion of the T connection at one side of the longitudinal portion thereof and coincident with one bottom run and also having a projecting collar $k$ surrounding said aperture, a cup having a sleeve arranged in the collar $k$ and end of the run, a longitudinal shaft extending through one bottom run and the cup therein and equipped at its forward end with a gear having its inner side shaped to form a cone, antifriction-balls interposed between the cup and cone, a crank-shaft journaled in the hanger and carrying a gear-wheel meshing with that of the shaft in the bottom run, and a case inclosing the intermeshed gears on the longitudinal and crank shafts and supported by the crank-hanger and the projecting collar $k$ of the frame, substantially as specified.

3. In a bicycle-frame, the combination of a tubular bottom run, a rear stay, a gear-case fixedly connected to the contiguous ends of the run and stay and having the notch in its outer side wall adapted to receive an axle and also having its inner side wall and its top and bottom walls partially cut away or recessed and further having its inner side wall notched to accommodate a wheel-hub, and a removable cap shaped in conformity to the recess in the inner side and rear end of the case and having its inner side wall notched to accommodate a wheel-hub and also having the apertured shank adapted to rest in the notch in the outer side wall of the case and provided with the offset adapted to bear against said side wall, substantially as specified.

4. In a bicycle-frame, the combination of a tubular bottom run, a rear stay, a gear-case fixedly connected to the contiguous ends of the run and stay and having a notch in its outer side wall adapted to receive an axle, and a removable cap for said case having a shank adapted to rest in and close the notch in the side wall thereof; said shank having an aperture to receive the axle of a wheel, substantially as specified.

In testimony whereof I affix my signature in presence of two witnesses.

GEORGE HARDEN.

Witnesses:
J. R. BROWN,
W. H. MITCHELL.